United States Patent
Savoor et al.

(10) Patent No.: US 9,432,292 B2
(45) Date of Patent: *Aug. 30, 2016

(54) OVERLOAD CALL CONTROL IN A VOIP NETWORK

(71) Applicant: AT&T Intellectual Property I, L.P., Atlanta, GA (US)

(72) Inventors: Raghvendra G. Savoor, Walnut Creek, CA (US); Steve Sposato, Lafayette, CA (US); Michael Liu, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 375 days.

This patent is subject to a terminal disclaimer.

(21) Appl. No.: 13/681,225

(22) Filed: Nov. 19, 2012

(65) Prior Publication Data
US 2013/0070591 A1    Mar. 21, 2013

Related U.S. Application Data

(63) Continuation of application No. 11/231,408, filed on Sep. 21, 2005, now Pat. No. 8,315,245.

(51) Int. Cl.
| | |
|---|---|
| *H04L 12/66* | (2006.01) |
| *H04L 12/801* | (2013.01) |
| *H04L 12/64* | (2006.01) |
| *H04L 12/803* | (2013.01) |
| *H04L 12/823* | (2013.01) |

(52) U.S. Cl.
CPC ........... *H04L 47/10* (2013.01); *H04L 12/6418* (2013.01); *H04L 47/122* (2013.01); *H04L 47/32* (2013.01)

(58) Field of Classification Search
CPC . H04L 47/10; H04L 12/6418; H04L 47/122; H04L 47/32
USPC ....... 370/229, 236, 352; 379/112.04, 112.08, 379/112.1, 133
See application file for complete search history.

(56) References Cited

U.S. PATENT DOCUMENTS

| | | |
|---|---|---|
| 3,796,837 A | 3/1974 | Mathews |
| 4,224,479 A | 9/1980 | Crawford |
| 4,497,978 A | 2/1985 | Schoute et al. |
| 4,511,762 A | 4/1985 | Stockdale |
| 4,626,625 A | 12/1986 | Daisenberger |
| 5,060,258 A | 10/1991 | Turner |
| 5,067,074 A | 11/1991 | Farel et al. |
| 5,295,183 A | 3/1994 | Langlois et al. |
| 5,509,063 A | 4/1996 | Crabtree et al. |
| 5,608,789 A | 3/1997 | Fisher et al. |
| 5,778,057 A | 7/1998 | Atai |

(Continued)

*Primary Examiner* — Oleg Asanbayev
(74) *Attorney, Agent, or Firm* — Jackson Walker L.L.P.

(57) ABSTRACT

The invention provides a system, method and apparatus for controlling a mass calling event in a VoIP network. The invention provides for monitoring port traffic information on a network edge device and detecting the occurrence of a mass calling event in conjunction with a call control module. Control instructions or information may then be provisioned to network edge devices to alleviate congestion. The invention enables network edge devices to gap or provide other controls to reduce call overloading. Controls for alleviating congestion include blocking the packets, providing an announcement to the call, re-routing the traffic associated with this specific mass calling event, and reducing the quality of the service.

20 Claims, 7 Drawing Sheets

(56) References Cited

U.S. PATENT DOCUMENTS

| | | |
|---|---|---|
| 5,933,481 A | 8/1999 | MacDonald |
| 6,259,776 B1 | 7/2001 | Hunt |
| 6,532,214 B1 | 3/2003 | Rumsewicz |
| 6,704,302 B2 | 3/2004 | Einbinder et al. |
| 6,738,351 B1 | 5/2004 | Qureshi et al. |
| 2003/0107991 A1 | 6/2003 | Tezuka et al. |
| 2004/0184419 A1* | 9/2004 | Park .............................. 370/328 |
| 2005/0163126 A1 | 7/2005 | Bugenhagen et al. |
| 2006/0233099 A1 | 10/2006 | Croak et al. |
| 2007/0002834 A1 | 1/2007 | Taylor |

\* cited by examiner

OVERLOAD CALL CONTROL IN A VOIP NETWORK

The present patent application is a continuation of U.S. patent application Ser. No. 11/231,408, filed Sep. 21, 2005, the entirety of which is hereby incorporated by reference.

FIELD OF THE INVENTION

The present invention relates in general to the field of interactively vending items through a video communication link.

DESCRIPTION OF THE RELATED ART

Currently the ability to purchase items via television or other display devices is limited to shopping networks which direct customers to the telephone or the internet to complete a transaction.

Telephone networks may become congested when there are problems with a switch in the network or with one or more resources in a switch. Other reasons for congestion in a telephone network include mass calling events, such as ticket sales concerts, radio call-in promotions, or natural disasters. During mass call events, thousands of calls may go through a particular switch of the telephone network. Switches have a limited capacity. Switches may be overwhelmed during the mass call event.

Traditional telephone networks, known as Public Switched Telephone Networks (PSTN) or Plain Old Telephone Service (POTS), generally handle call congestion by having the switches in the network communicate. For example, an originating switch transmits a call setup message, often termed as "SS7," for a call to a destination switch. If the destination switch is experiencing congestion it will not properly handle incoming calls. Responsive to receiving the call setup message, the destination switch processes a priority bit of the call setup message to determine if the call is a high priority call. If the call is a high priority call, then the destination switch attempts to connect the call. If the call is not a high priority call, then the destination switch may discard the call attempt if it has already sent an SS7 congestion message or may transmit an SS7 congestion message to the originating switch. Responsive to the congestion message, the originating switch performs call blocking on calls headed for the destination switch. The originating switch also provides call treatment for the blocked calls, such as playing tones or a message.

To provide higher bandwidths and enhanced features, packet networks such as The internet is a large global internetwork of Internet Protocol (IP) Networks. These are packet networks that connect tens of thousands of networks worldwide that have also been implemented for voice and data communications. Assume that a caller wants to place a voice call over a packet network using a Session Initiation Protocol (SIP) phone. To set up the call, the SIP phone sends an invite message to a gateway controller. Responsive to the invite message, the gateway controller responds to the SIP phone, such as with a network address of the destination of the call.

When voice communications are placed in this packet communication environment, the networks may be referred to as Voice over Internet Protocol (VoIP) Networks or Voice over IP. VoIP enables the capability to carry normal telephony-style voice over an IP-based internet with POTS-like functionality, reliability, and voice quality. VoIP enables a router to carry voice traffic (for example, telephone calls and faxes) over an IP network. In VoIP, the digital signal processor (DSP) segments the voice signal into frames, which then are coupled in groups of two and stored in voice packets. When VoIP telephone traffic is added to telephone networks, the problems with congestion may increase substantially, since telephone switches may be unable to function effectively to gap or otherwise suppress an overload of call attempts in a telephone network.

U.S. Pat. No. 4,224,479 to Crawford, 'Method of controlling call traffic in a communication switching system' discloses that call traffic in a stored program controlled telephone switching system is controlled by performing code gapping on telephone calls to a particular called customer. Code gapping is performed by limiting the rate at which successive attempts may be made to complete all or part of a call to the particular called customer which is identified by a called customer code, such as a Plain Old Telephone Service (POTS) called customer directory code. A Minimum Time (MT), such as 10 seconds, is prescribed as the MT for the POTS number. A record is made of the Last Clock Time (LCT) at which the last earlier allowed attempt was made to complete a call to the POTS number. The Present Clock Time (PCT) is noted as the time at which completion of a subsequent call to the POTS number is presently desired. The subsequent call completion attempt is denied if the MT for the POTS number has not expired since the LCT for the POTS number; but, if the MT has expired, the subsequent call completion attempt is allowed and the PCT becomes the new LCT for the POTS number, U.S. Pat. No. 5,060,258 to Turner, 'Call traffic control' discloses a method of call control (gapping) and a communications switching system in which such method is implemented, the system incorporating a call gapping arrangement for limiting the recurrence rate of successive call attempts for a particular type of call, for example to a national phone-in number, the arrangement comprising a clock for determining a succession of call gapping intervals; a first up/down counter having a limit N; a signal generator responsive to the clock and coupled to the counter to increment it by a value m each interval; a second up/down counter having a limit M less than N, the counters being responsive to call processing circuitry to be decremented for each call attempt effected by the system: a comparator responsive to the content of counter becoming zero to inhibit the call processing circuitry from allowing call attempts.

U.S. Pat. No. 5,933,481 to MacDonald, 'Method of controlling call traffic in a telecommunication system' discloses A method of controlling call traffic in a telecommunication system by dynamically altering the rate at which offered calls are accepted includes the steps of successively determining the offered call rate, and accepting calls from the offered calls, at a lower rate, as the offered call rate increases. For accepting the offered calls, at least two call-gapping intervals are used. The method includes selecting the shorter gapping interval whenever the offered call rate is below a threshold value and the longer gapping interval whenever it is above that value.

U.S. Pat. No. 6,259,776 to Hunt, 'System for controlling telecommunication overload traffic' discloses a telecommunications network includes a processor controlled switch and a network intelligence platform overload control function runs in the network intelligence layer. The overload control function measures the period of time taken to handle a call switching request and if the time taken exceeds a predetermined quality of service threshold, it implements a call gapping function. The call gapping function modifies the gapping period such that requests to effect calls to particular destinations are spaced and any call arriving at a switching point prior to expiration of the gap period is automatically rejected by the local control processor. As the overload control function runs in a plurality of nodes, which may be file servers of the intelligence layer, the gapping period returned to the switch is dependent upon the perceived overload at the particular node. Traffic variations at the nodes may result in variations in the gapping period between nodes and therefore each node is arranged to communicate with other nodes to determine an average gapping period for the group of nodes and individual gapping periods in the nodes are relaxed towards the average value.

There is a need for a telephone call handling method and system in VoIP networks that does not rely on switches and is sensitive to call overload conditions that may be initiated by a mass calling event. The present invention addresses this need.

SUMMARY OF THE INVENTION

The invention provides a system, method and apparatus for controlling a mass calling event in a VoIP network. The invention provides for monitoring port traffic information on a network edge device and detecting the occurrence of a mass calling event in conjunction with a call control module. Control instructions or information may then be provisioned to network edge devices to alleviate congestion. The invention enables network edge devices to gap or provide other controls to reduce call overloading. Controls for alleviating congestion include blocking the packets, providing an announcement to the call, re-routing the traffic associated with this specific mass calling event, and reducing the quality of the service.

Examples of the more important features of the invention have been summarized (albeit rather broadly) in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE FIGURES

Features of the present invention will become apparent from the following detailed description considered in connection with the accompanying drawings disclosing embodiments of the present invention. It should be understood, however, that the drawings are designed for the purpose of illustration only and not as a definition of the limits of the invention. For a detailed understanding of the present invention, references should be made to the following detailed description of an exemplary embodiment, taken in conjunction with the accompanying drawings, in which like elements have been given like numerals in the drawings, wherein similar reference characters denote similar elements throughout the several views.

Figure 1:
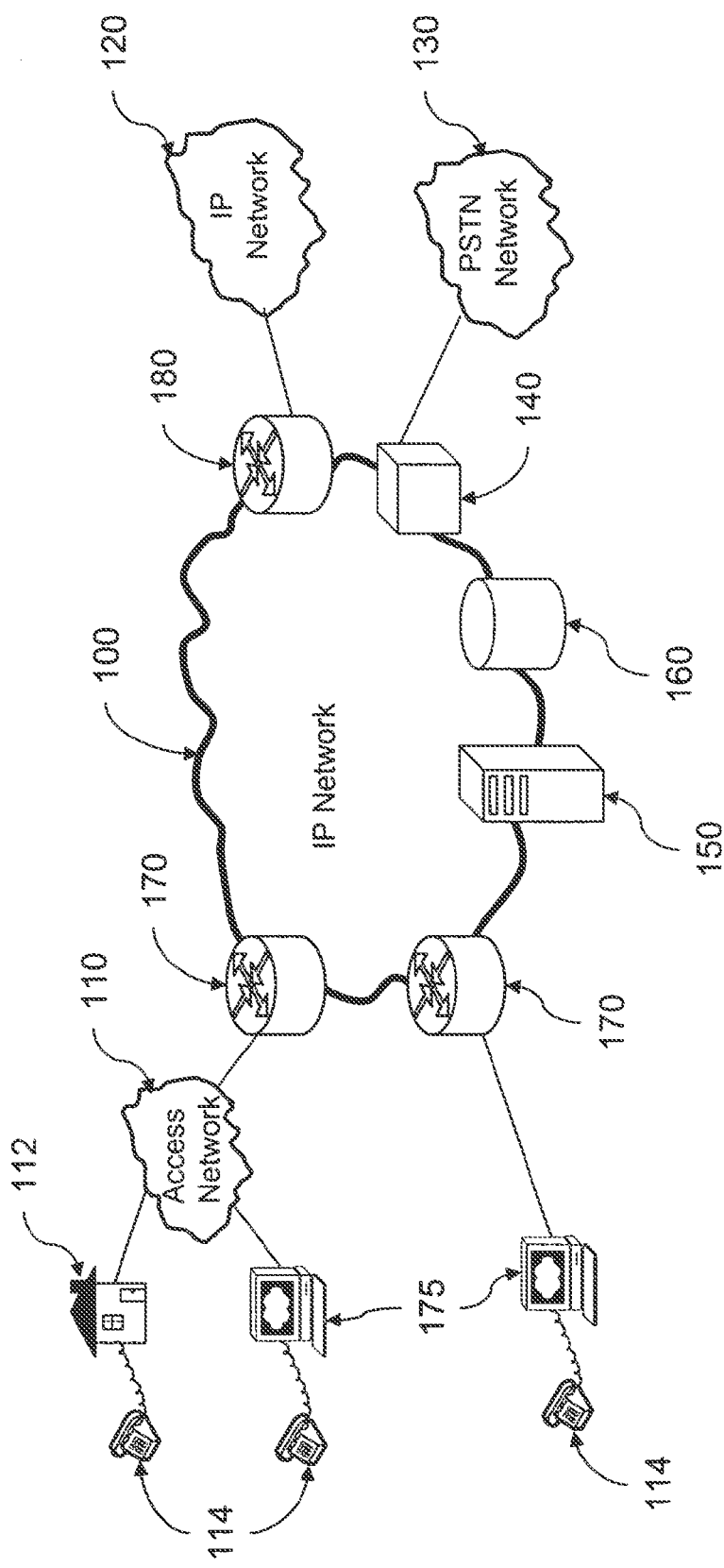
FIG. 1 illustrates a VoIP network with interconnections.

While the invention will be described in connection with its preferred embodiments, it will be understood that the invention is not limited thereto. It is intended to cover all alternatives, modifications, and equivalents that may be included within the spirit and scope of the invention, as defined by the appended claims.

DETAILED DESCRIPTION OF THE INVENTION

In view of the above, the present invention through one or more of its various aspects and/or embodiments is presented to provide one or more advantages, such as those noted below. The present invention provides for control of congestion on VoIP communication networks due to call initiation overloads.

The present invention provides for control and gapping of the calls resulting from a mass calling event in a VoIP network, The traffic may be gapped at the servers, databases or other network elements associated with VoIP infrastructure. The method and architecture demonstrate control and gapping the mass calling voice traffic at the edge of the network before it adversely affects the critical VoIP infrastructure. Practitioners in the art will understand that when an IP Network is used for voice packet communication, the network may be referred to as a VoIP Network.

The present invention provides that the gapping function will be initiated at the edge or border of the network. In the case of a mass calling event, this method controls and gaps the traffic at the edge or the border of the network. This minimizes the impact of the mass traffic to the critical servers and databases used in a VoIP network.

The present invention, in one aspect, provides a communication network to gap the calls, resulting from a mass traffic event, in the Voice over IP (VoIP) network at the network access (edge) or at the border of the network. With this method, an VoIP Network can initiate call gapping by dynamically detecting a mass calling event or by using a pre-provisioned gap list.

Call gapping is well understood by practitioners of the art with regard to telephone switching technologies. Call gapping, which may be automatic or manual, can be implemented to relieve some overloaded part of a network by, for example, i) introducing a minimum time gap between consecutive call attempts to part of the Network, or ii) admitting only a maximum number of attempts during a time slot of a defined duration. When call gapping is performed, waiting may not be permitted. Attempts which cannot be forwarded immediately (subject to the time gap restriction) may be rejected by the Network.

For the method of the present invention, when handling a mass calling event, call gapping may be initiated in conjunction with a database or server to stop the traffic using network edge devices. The server or database will initiate gapping by sending messages a network edge device and requested the network edge device to apply gapping or control. The server or database can initiate gapping either via a response mode or broadcast mode.

IP Networks comprise routers. A router is a computer networking device that forwards data packets toward their destinations. Routing generally occurs at OSI layer 3 (Network layer). An edge router connects clients to the Internet or other IP Networks. An edge router is a device that routes data packets between one or more local area networks (LANs) and an Asynchronous Transfer Mode (ATM) backbone network, whether a campus network or a wide area network (WAN). An edge router is an example of an edge device and is sometimes referred to as a boundary router. An edge router is sometimes contrasted with a core router, which forwards packets to computer hosts within a network (but not between networks). For the purposes of the present invention, the term 'network edge device' encompasses the routers or gateway devices that interface to an IP Network used to support VoIP applications.

FIG. 1 depicts an IP Network 100 used to support VoIP applications. The IP network 100 is interconnected to other IP networks via edge or border routers to exchange IP packets (which may include VoIP packets).

Non-exclusive examples of interconnected networks include access network 110, IP Network 120 and PSTN Network 130. An access network 110 includes connections to an end user facility and telephone 114. The access network 110 may connect direct to a computing facility 190 that may include a telephone 114. An access network 110 may connect directly to an IP network through an edge router 170. Alternatively, a computing facility 190 that includes a telephone 114 may connect directly to an IP network through an edge router 170. A separate IP network 120 may connect to IP Network 100 through a border router 180.

The IP network 100 also interconnects with the PSTN network 130 via a gateway 140 to handle calls with users on the PSTN network 130. The VoIP users are interconnected to a serving IP network 120 directly or via other non-IP access network (or technology). Inside the IP network 100, there are network elements deployed specifically for VoIP applications, such as a network feature servers 150 and the network databases 160. These elements of the VoIP environment may have the capability to gap VoIP calls when experiencing a call overload event. For example, if there is a mass calling event (e.g., radio station contest), these elements will send back response message to a traffic source to suppress the incoming traffic. These network elements can detect the event dynamically (e.g., high processor utilization or large number of calls per set duration) or statistically (i.e., the control targets are provisioned specific to that event).

FIG. 1 shows network edge devices (also called port devices) for IP Network 100. These include edge routers 170 and boundary router 180 and other gateways. The present invention provides that the network edge device associated with monitored ports may have the following functionalities: 1) Deep packet inspection on all IP packets sent or received; 2) Monitoring of both VoIP signaling and bear traffic at a specified interval; 3) Forwarding pertinent VoIP traffic information; 4) Gapping and control of the calls on a per TN or per source-destination pair basis; 5) Receiving gapping and control commands or instructions from a remote system (or device).

The traffic information traversing ports on network edge devices may include the following elements: a) Port utilization; b) Incoming call volume on a per telephone number (TN), or equivalent, basis; and c) Incoming call volume on a per source-destination pair basis. Further relevant source-destination pair information may include an IP address and sockets at both source and destination.

Figure 2:
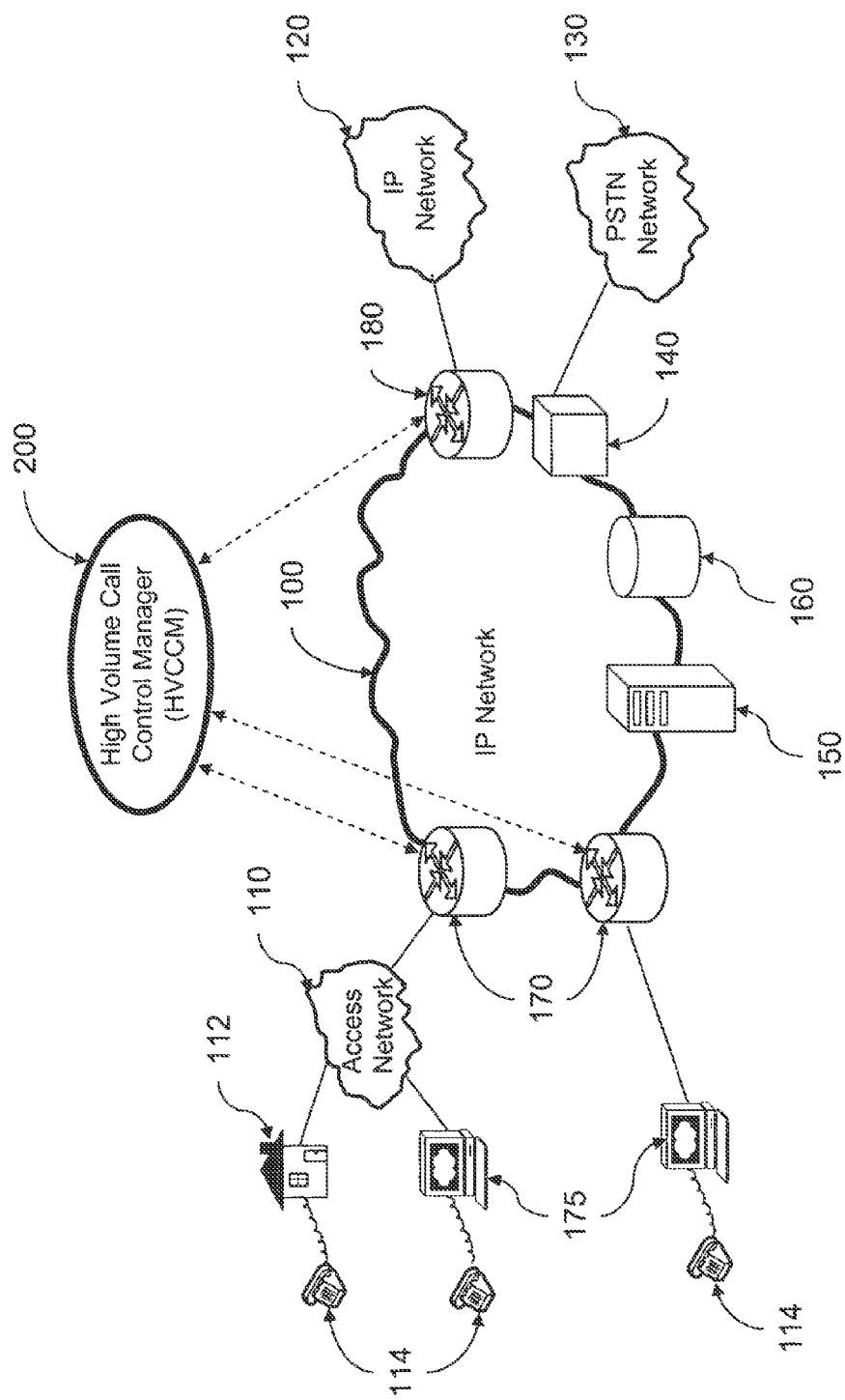
FIG. 2 illustrates a VoIP network with interconnections with call control according to one aspect provided by the present invention.

FIG. 2 depicts a representative architecture, including a call control manager (or module), termed herein the High Volume Call Control Manager (HVCCM) 200, provided by the present invention. The HVCCM 200 communicates with IP Network 100 edge devices (170, 180) and may receive telephone or other communications traffic information from the edge routers for each port at a set interval. While an interval may be defined in terms of a time period, an interval may also be defined in terms of a number of calls or events. The information may be stored in memory, on a server or in a telephone number database for analysis. The traffic information includes but is not limited to the following elements: i) port utilization, ii) incoming call volume on a per telephone number basis, iii) incoming call volume on a per source-destination pair basis, and iv) status of the calls.

Figure 6:
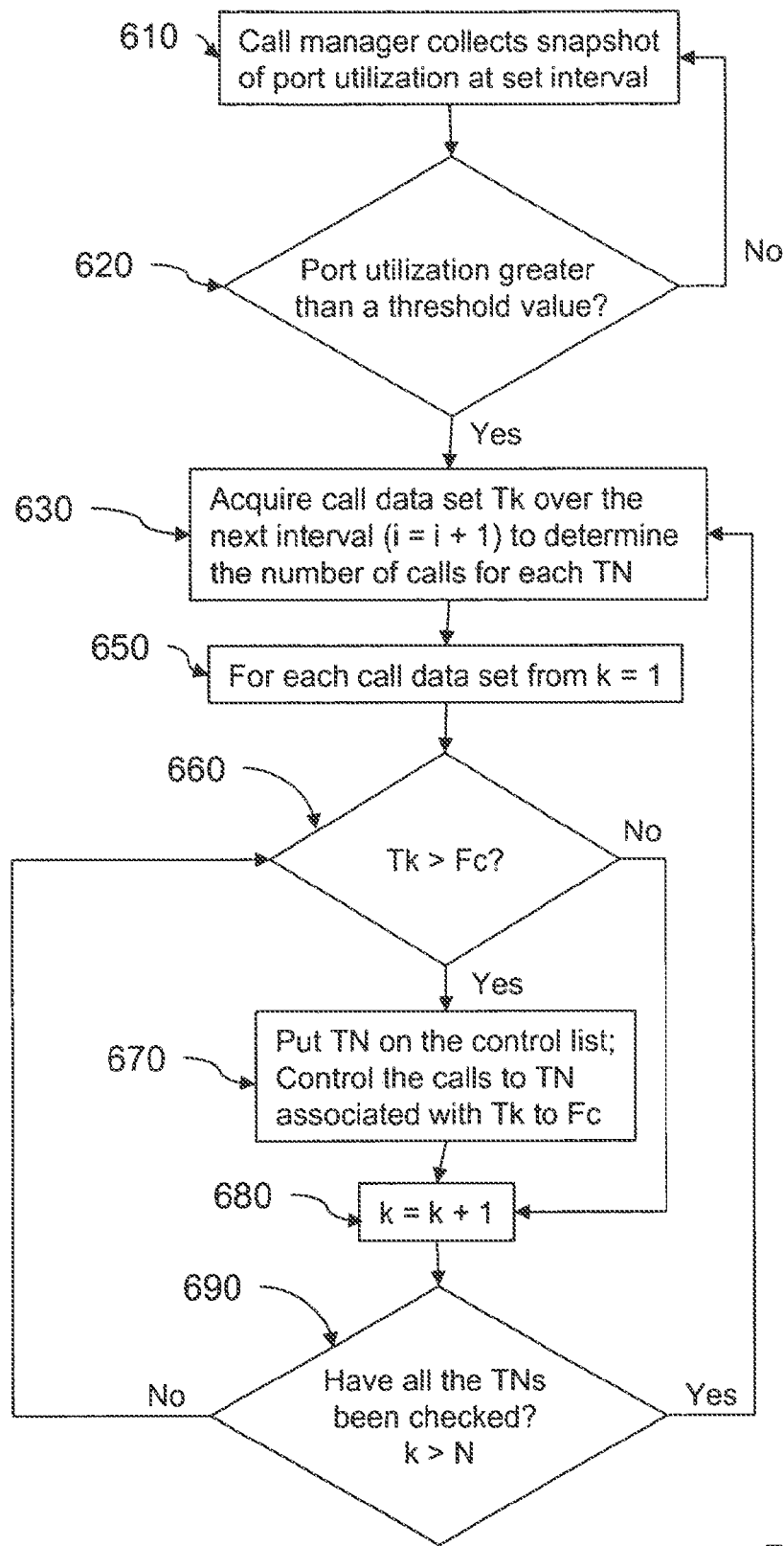
FIG. 6 illustrates a flow chart of a method provided by the present invention.

HVCCM 200 is able to detect the occurrence of the mass calling event. Once a target is identified as a cause of a high volume call event, HVCCM 200 may provide for gapping or control of new calls or communications associated with the target. FIG. 6 shows a flowchart of automatic detection by TN.

HVCCM 200 may provision call gapping and control of the target (TNs or source-destination pair) via the network edge device. The following types of information can be provisioned on the port (or to the edge device) via HVCCM: i) Target TN or destination (source-destination pair), ii) The overload level, and iii) Control or gapping mechanism/treatment.

HVCCM may store, temporarily or permanently on a server, the call history and call status of the VoIP calls routed on the monitored ports over a reasonable time interval, which may be monitored with a moving window, The call history contains the number of calls attempted on a per TN basis and/or number of calls attempted on a per source-destination pair. The call status contains the status of all the active calls.

Once a mass calling event is detected, HVCCM may control or gap the targeted calls based on different levels of overload. Depending on the overload level, the HVCCM may allow a percentage of new calls into the IP network. The higher the overload level, smaller the percentage. The packets associated with the existing or active calls may be given priority. If possible and depending on conditions, HVCCM may allow these packets to continue.

For the calls not allowed in the network, HVCCM can provide these treatment: i) Block and discard the packets, ii) Provide announcement to the call, iii) Re-route the traffic via a specific link or route that dedicated to handle the traffic associated with this specific mass calling event, and iv) Reduce the quality of the service by changing the voice coding/compression of the traffic packet.

Figure 7:
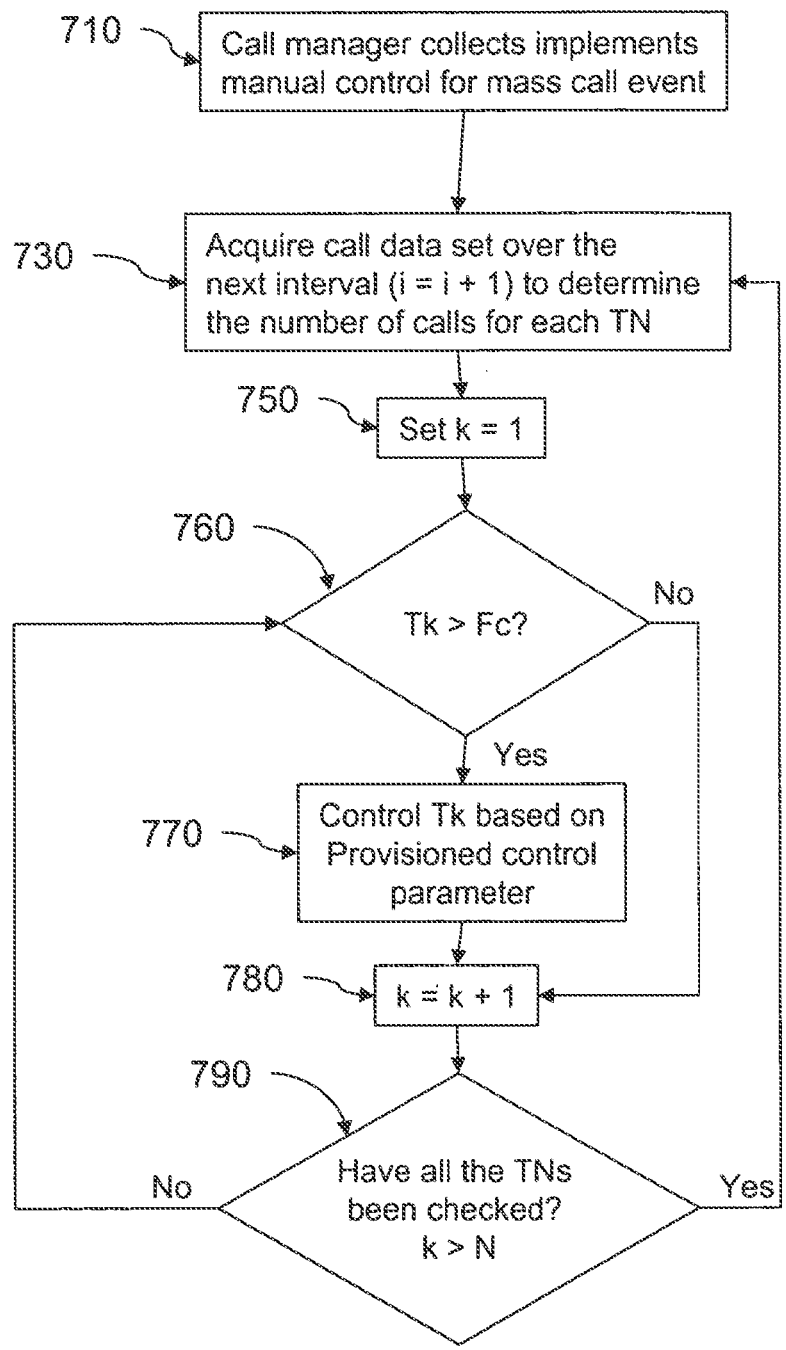
FIG. 7 illustrates a flow chart of an alternative method provided by the present invention.

Manual control by a network operator may be implemented in the case where the mass calling event is known prior to its occurrence. The HVCCM may gap and control the calls for the target TNs or source-destination pair on the specified ports as provisioned by a network operator. FIG. 7 shows a flowchart for manual control of a mass calling event. Again, HVCCM can control or gap based on the following types of information: i) Target TN or destination (source-destination pair), ii) The control/overload level, and iii) Control or gapping mechanism/treatment.

Three scenarios are presented for illustration here: i) a target in the local IP network, ii) a target in the interconnecting IP network and iii) a target in the interconnecting PSTN network. The term 'target' refers to the communication target of the mass calling event (e.g., the TN of the radio station that is holding a contest). The mass calling event may be unexpected such that there is no control or gapping provisioned prior to the occurrence of the event.

Figure 3:
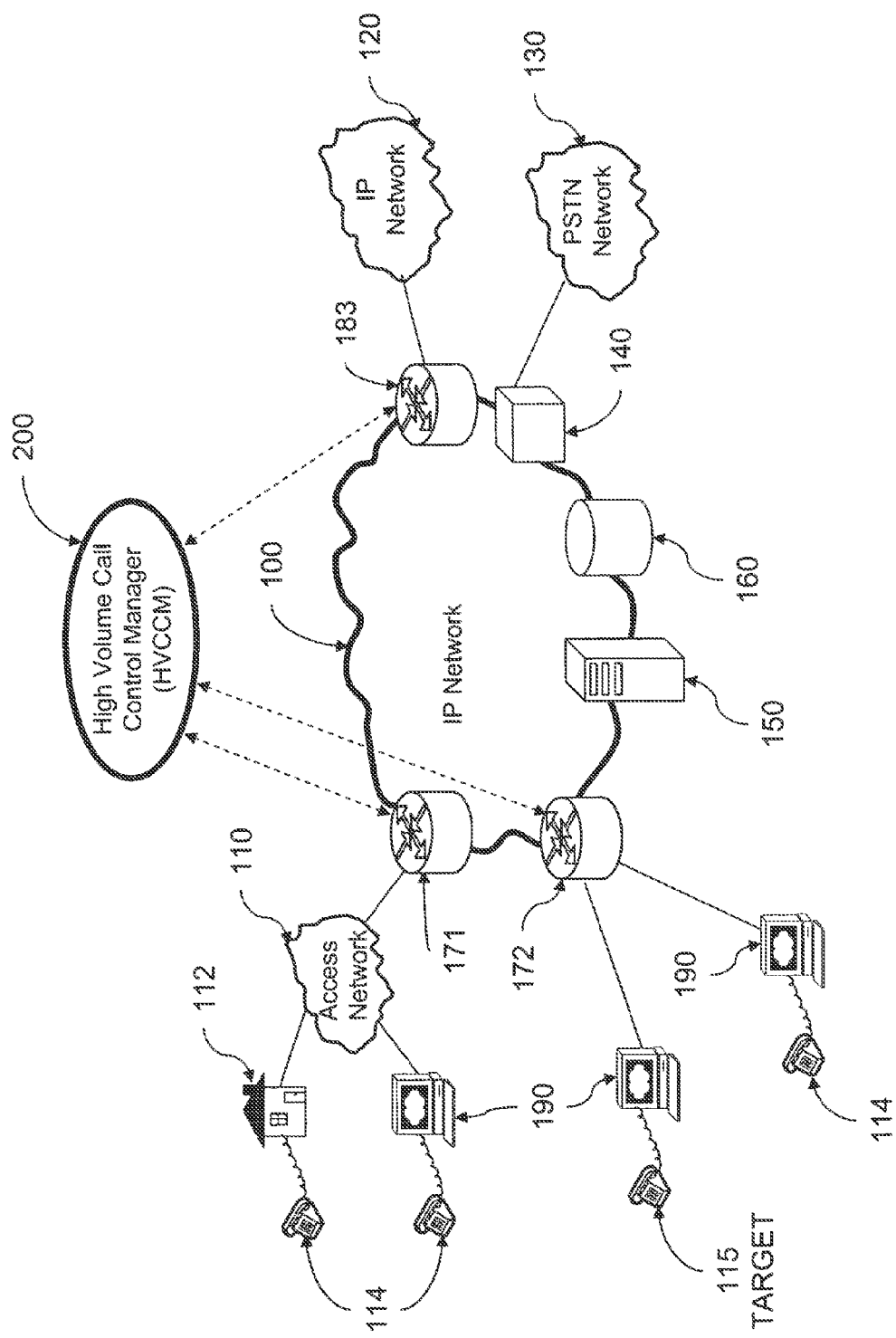
FIG. 3 illustrates an embodiment provided by the present invention with the target communication node located in or adjacent to a local VoIP network.

FIG. 3 illustrates a situation where a target TN 115 or communication node is located in or adjacent to a local IP network 100 with no prior notification of the mass calling event. HVCCM 200 receives port information from edge router 171, edge router 172, border router 183 and any other edge devices in the network. Incoming calls route through ports on the edge devices. Information from the ports is passed to HVCCM 200 along with any HVCCM associated servers or databases. Using this information, the HVCCM detects the mass calling event. Control and gapping is then provisioned to edge devices 171, 172, 183 and any others present on IP Network 100, such that a subset of initiated calls is allowed to pass to target 115.

Figure 4:
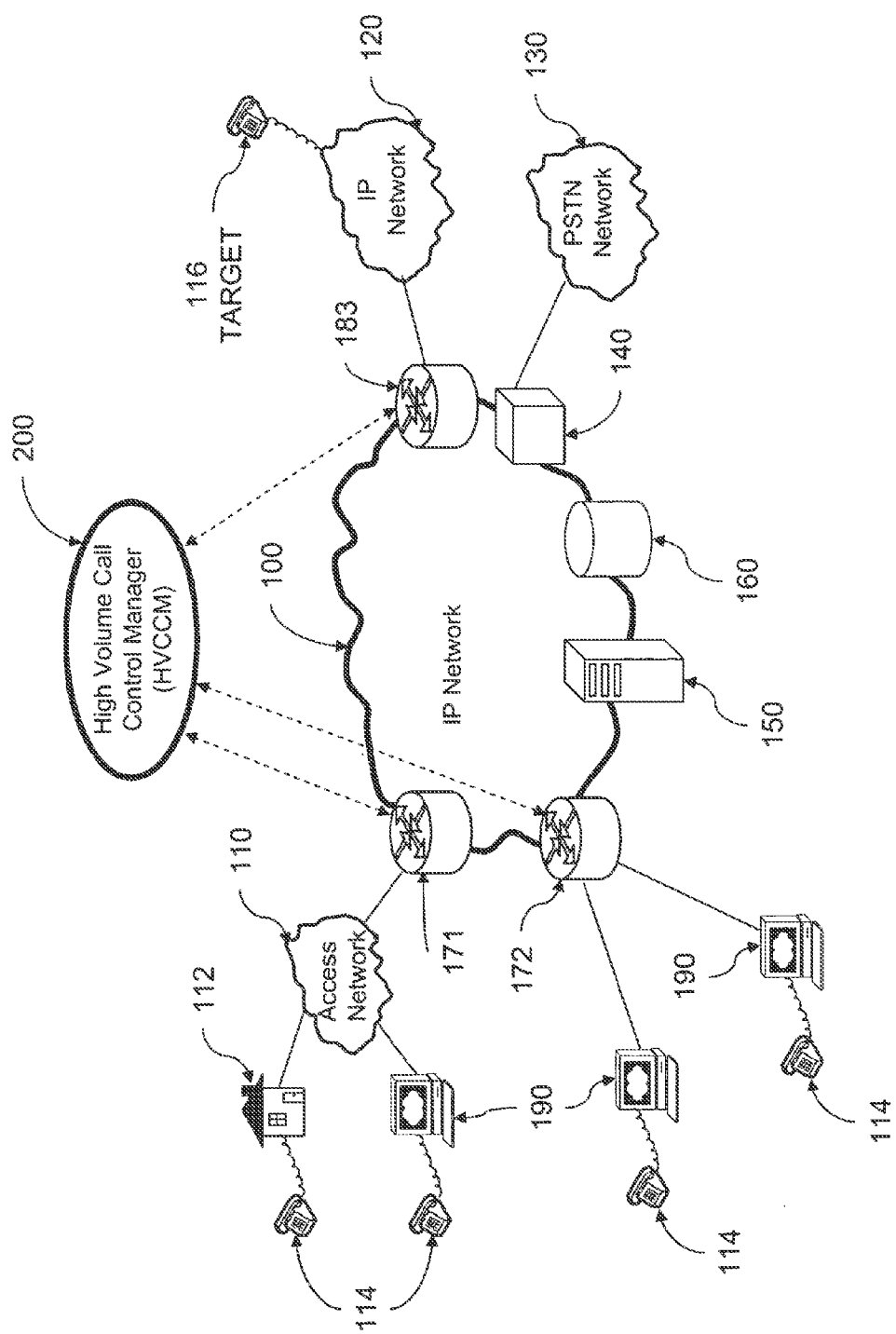
FIG. 4 illustrates an embodiment provided by the present invention where a target communication link is located in the interconnecting VoIP network.

FIG. 4 illustrates a situation where a target 116 is located in the interconnecting IP network 120 with no prior notification of the mass calling event. HVCCM 200 receives port information from edge router 171, edge router 172, border router 183 and any other edge devices in the network. Incoming calls route through ports on the edge devices. Information from the ports is passed to HVCCM 200 along with any HVCCM associated servers or databases. Using this information the HVCCM detects the mass calling event. Control and gapping may then be provisioned to edge devices 171, 172, 183 and any other edge devices present on IP Network 100, such that a subset of initiated calls is allowed to pass to target 116.

Figure 5:
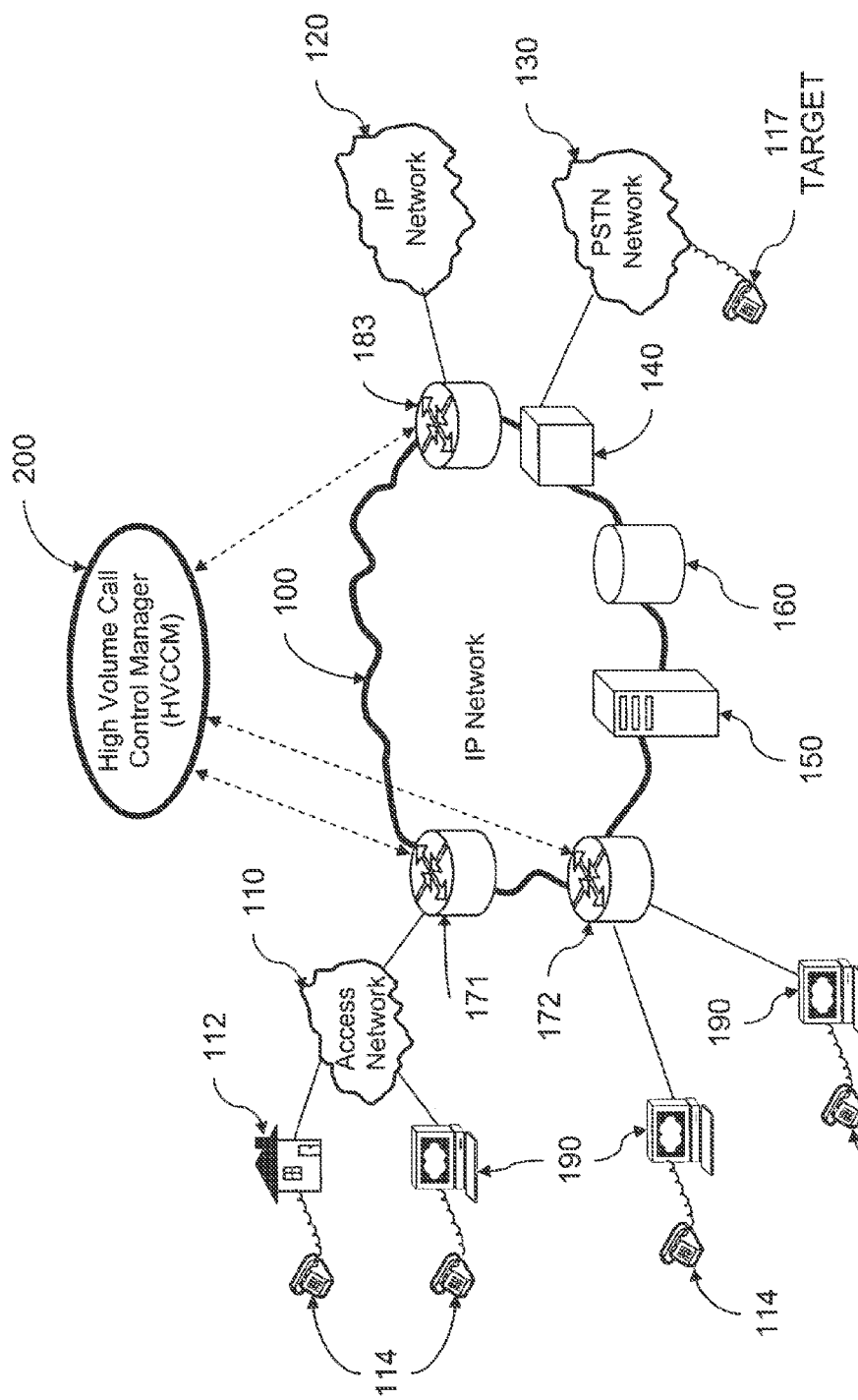
FIG. 5 illustrates an embodiment provided by the present invention where a target 117 is located in the interconnecting PSTN network.

FIG. 5 illustrates a situation where a target 117 is located in the interconnecting PSTN network 130 with no prior notification of the mass calling event. HVCCM 200 receives port information from edge router 171, edge router 172, border router 183 and any other edge devices in the network. Incoming calls route through ports on the edge devices. Information from the ports is passed to HVCCM 200 along with any HVCCM associated servers or databases. Using this information the HVCCM detects the mass calling event. Control and gapping may then be provisioned to edge devices 171, 172, 183 and any other edge devices present on IP Network 100, such that a subset of initiated calls is allowed to pass to target 117.

FIG. 6 shows a flowchart for automatic detection of a mass calling event. A network call control manager collects port information 610 from edge devices at a set or variable interval. Information collectable or derivable includes port utilization, $U_i$, over an interval i, port capacity, C, the percentage threshold increase per port, $F_p$, and the number of calls per TN threshold, $F_c$. From these or similar parameters, whether port utilization is greater than a threshold may be determined 620. For example, one method is to determine the percentage increase threshold per port as $F_p = (U_i - U_{i-1})/C$. Methods for determining what thresholds should be and whether thresholds are passed will be apparent to practitioners of the art.

When port utilization increases over a threshold, data may be acquired for each telephone call to acquire a dataset, $T_k$ for telephone calls over an interval i, 630 to determine a number of calls for each TN. Then, for each telephone number in $T_k$ 650, whether the number of calls for an individual telephone number in $T_k$ is greater than a threshold (for example, $F_c$) may be determined 660. If the number of calls to an individual telephone number is above a threshold, the TN is placed on a control list 670 in a database or server, and the calls to the TN may be controlled by provisioning instructions or information from the call manager to the IP Network edge devices. The edge devices may then be enabled to control or gap the calls to the problematic TN. Subsequently, the next $T_k$ is examined 680 until all have been checked 690.

FIG. 7 shows a flowchart for manual control of a mass calling event. A network call control manager implements manual control 710 of a mass call event and acquires information, Information includes target TNs requiring control, $TN_i$, the total number of TNs on the manual control list, N, the duration of control for $TN_i$, $D_i$, and the number of calls per TN threshold, $F_c$.

When port utilization during an observed interval increases over a threshold, data may be acquired for the target TNs to acquire a dataset, $T_k$ over an interval, 730 to determine a number of calls for each TN. Then, for each telephone number in $T_k$ 650, whether the number of calls for an individual telephone number in $T_k$ is greater than a threshold (for example, $F_c$) may be determined 760. if an individual telephone number is above a threshold, the $T_k$ is controlled by provisioning instructions or information from the call manager to the IP Network edge devices. The next $T_k$ is examined 780 until all have been checked 790.

In one aspect the invention provides for a method, system and apparatus for controlling a mass calling event wherein a plurality of source destinations (calling parties) in a VoIP Network initiate calls to a target destination (the called party). A mass calling event is detected and in response calls to the target destination are controlled. The invention provides for a plurality of network edge devices associated with the plurality of the source destinations. The mass calling event may be detected at the plurality of network edge devices in conjunction with call control module. The call control module provides control instructions to at least one of the plurality of network edge devices for control of call overload conditions.

In another aspect the present invention provides for a computer readable medium containing instructions that when executed by a computer perform a computerized method for controlling a mass calling event in a VoIP network. Port traffic information is monitored on a network edge device like an edge router or other gateway device. A mass calling event is detected from the monitored information. When a mass calling event is detected, control instructions may then be provisioned to the network edge device. A dataset of telephone calls traversing network edge device ports may be acquired to determine a number of calls over an interval. Instructions for dealing with the mass call event may be any of: i) blocking the packets, ii) providing an announcement to the call, iii) re-routing the traffic associated with this specific mass calling event, and iv) reducing the quality of the service. Monitoring the port traffic information includes acquiring information concerning : i) port utilization, ii) incoming call volume on a per telephone number basis, iii) incoming call volume on a per source-destination pair basis, and iv) status of the calls.

In yet another aspect, a method, system and apparatus is provided by the present invention for control of a mass calling event. Port traffic information is monitored on a network edge device like an edge router or other gateway device. A mass calling event is detected from the monitored information. For example, when monitoring traffic information on network edge devices further comprises determining whether port utilization is greater than a threshold value. When a mass calling event is detected, control instructions may then be provisioned to the network edge device. A dataset of telephone calls traversing network edge device ports may be acquired to determine a number of calls over an interval. Instructions for dealing with the mass call event may be any of: i) blocking the packets, ii) providing an announcement to the call, iii) re-routing the traffic associated with this specific mass calling event, and iv) reducing the quality of the service. Monitoring the port traffic information includes acquiring information concerning: i) port utilization, ii) incoming call volume on a per telephone number basis, iii) incoming call volume on a per source-destination pair basis, and iv) status of the calls.

Another aspect of the present invention provides a system for controlling a mass calling event in a VoIP network. The system comprises a network edge device for monitoring port traffic information; a telephone number information database for storing the port traffic information; a processor configured to detect an occurrence of a mass calling event from the port traffic information; and a call control module for provisioning call control instructions to the network edge device. The network edge device may have a processor. The telephone number database derived from information traversing the network edge device port may be stored on a server. The call control module may provision control instructions or information to a plurality of network edge devices. Instructions for dealing with the mass call event may be any of i) blocking the packets, ii) providing an announcement to the call, iii) re-routing the traffic associated with this specific mass calling event, and iv) reducing the quality of the service. Monitoring the port traffic information includes acquiring information concerning: i) port utilization, ii) incoming call volume on a per telephone number basis, iii) incoming call volume on a per source-destination pair basis, and iv) status of the calls.

Another aspect provided by the present invention comprises set of application program interfaces embodied on a computer readable medium for execution on a computer in conjunction with an application program that controls calls resulting from a mass calling event in a VoIP network. The interfaces include a first interface that monitors port traffic information on a network edge device; a second interface that detects the occurrence of a mass calling event; and a third interface that provisions instructions for control of the mass calling event to the network edge device. A fourth interface receives an input from a plurality of network edge devices. A fifth interface determines a threshold value of port utilization. A sixth interface receives an input for generating control instructions to send to one or more network edge devices. Additionally, the second interface may also generate a telephone number control list.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

What is claimed is:

1. A call control method, comprising:
   detecting, on a port of a network edge device, a telephone call port utilization increase, corresponding to a difference between the port utilization during a prior interval and the port utilization during a subsequent interval, exceeding a particular threshold;
   responsive to said detecting, obtaining information indicative of a quantity of telephone calls to a common target destination during a first interval of time;
   in response to the quantity of telephone calls sharing the common target destination during the first interval of time exceeding a second threshold, sending, to a network edge device associated with the common target destination, a provisioning instruction to take mass calling event action including:
   blocking at least some packets associated with the mass calling event;
   re-routing at least some packets associated with the mass calling event, and
   reducing a quality of service for at least some packets associated with the massing calling event.

2. The method of claim 1, wherein blocking at least some packets comprises blocking at least some packets associated with the common target destination.

3. The method of claim 1, wherein reducing a quality of service comprises reducing a quality of service for calls associated with the common target destination.

4. The method of claim 1, wherein re-routing at least some packets includes re routing at least some traffic addressed to the common destination target.

5. The method of claim 1, wherein the provisioning instruction instructs the network edge device to provide an announcement to a caller calling the common network address.

6. The method of claim 1, wherein the provisioning instruction instructs the network edge device to alter a voice coding of telephone calls that share the common target destination.

7. The method of claim 1, wherein the obtaining of information indicative of a quantity of telephone calls occurs responsive to obtaining information indicative of an increase in a port utilization of the network edge device exceeding a specified percentage.

8. A server, comprising:
a processor;
a computer readable storage medium, accessible to the processor, including stored program instructions that, when executed by the processor, perform operations, comprising:
detecting, on a port of a network edge device, a percentage increase in telephone call port utilization exceeding a particular threshold;
telephone call port utilization increase, corresponding to a difference between the port utilization during a prior interval and the port utilization during a subsequent interval,
responsive to said detecting, obtaining information indicative of a quantity of telephone calls to a common target destination during a first interval of time;
in response to the quantity of telephone calls sharing the common target destination during the first interval of time exceeding a second threshold, sending, to a network edge device associated with the common target destination, a provisioning instruction to take mass calling event action including:
blocking at least some packets associated with the mass calling event;
re-routing at least some packets associated with the mass calling event, and
reducing a quality of service for at least some packets associated with the massing calling event.

9. The server of claim 8, wherein blocking at least some packets comprises blocking at least some packets associated with the common target destination.

10. The server of claim 8, wherein reducing a quality of service comprises reducing a quality of service for calls associated with the common target destination.

11. The server of claim 8, wherein re-routing at least some packets includes re routing at least some traffic addressed to the common destination target.

12. The server of claim 8, wherein the provisioning instruction instructs the network edge device to provide an announcement to a caller calling the common network address.

13. The server of claim 8, wherein the provisioning instruction instructs the network edge device to alter a voice coding of telephone calls that share the common target destination.

14. The server of claim 8, wherein the obtaining of information indicative of a quantity of telephone calls occurs responsive to obtaining information indicative of an increase in a port utilization of the network edge device exceeding a specified percentage.

15. A non-transitory computer readable storage medium including stored program instructions, executable by a processor, wherein the program instructions, when executed preform operating comprising:
detecting, on a port of a network edge device, a telephone call port utilization increase, corresponding to a difference between the port utilization during a prior interval and the port utilization during a subsequent interval, exceeding a particular threshold;
responsive to said detecting, obtaining information indicative of a quantity of telephone calls to a common target destination during a first interval of time;
in response to the quantity of telephone calls sharing the common target destination during the first interval of time exceeding a second threshold, sending, to a network edge device associated with the common target destination, a provisioning instruction to take mass calling event action including:
blocking at least some packets associated with the mass calling event;
re-routing at least some packets associated with the mass calling event, and
reducing a quality of service for at least some packets associated with the massing calling event.

16. The non-transitory computer readable storage medium of claim 15, wherein blocking at least some packets comprises blocking at least some packets associated with the common target destination.

17. The non-transitory computer readable storage medium of claim 15, wherein reducing a quality of service comprises reducing a quality of service for calls associated with the common target destination.

18. The non-transitory computer readable storage medium of claim 15, wherein re-routing at least some packets includes re routing at least some traffic addressed to the common destination target.

19. The non-transitory computer readable storage medium of claim 15, wherein the provisioning instruction instructs the network edge device to alter a voice coding of telephone calls that share the common target destination.

20. The non-transitory computer readable storage medium of claim 15, wherein the obtaining of information indicative of a quantity of telephone calls occurs responsive to obtaining information indicative of an increase in a port utilization of the network edge device exceeding a specified percentage.

* * * * *